Sept. 8, 1931. M. KIND 1,822,530
APPARATUS FOR HANDLING CEMENT OR LIKE MATERIAL IN BULK
Filed June 14, 1930 4 Sheets-Sheet 1

Sept. 8, 1931.  M. KIND  1,822,530
APPARATUS FOR HANDLING CEMENT OR LIKE MATERIAL IN BULK
Filed June 14, 1930  4 Sheets-Sheet 2

INVENTOR
Morris Kind
BY
ATTORNEYS

Sept. 8, 1931.　　　　　　　M. KIND　　　　　　1,822,530
APPARATUS FOR HANDLING CEMENT OR LIKE MATERIAL IN BULK
Filed June 14, 1930　　　4 Sheets-Sheet 3
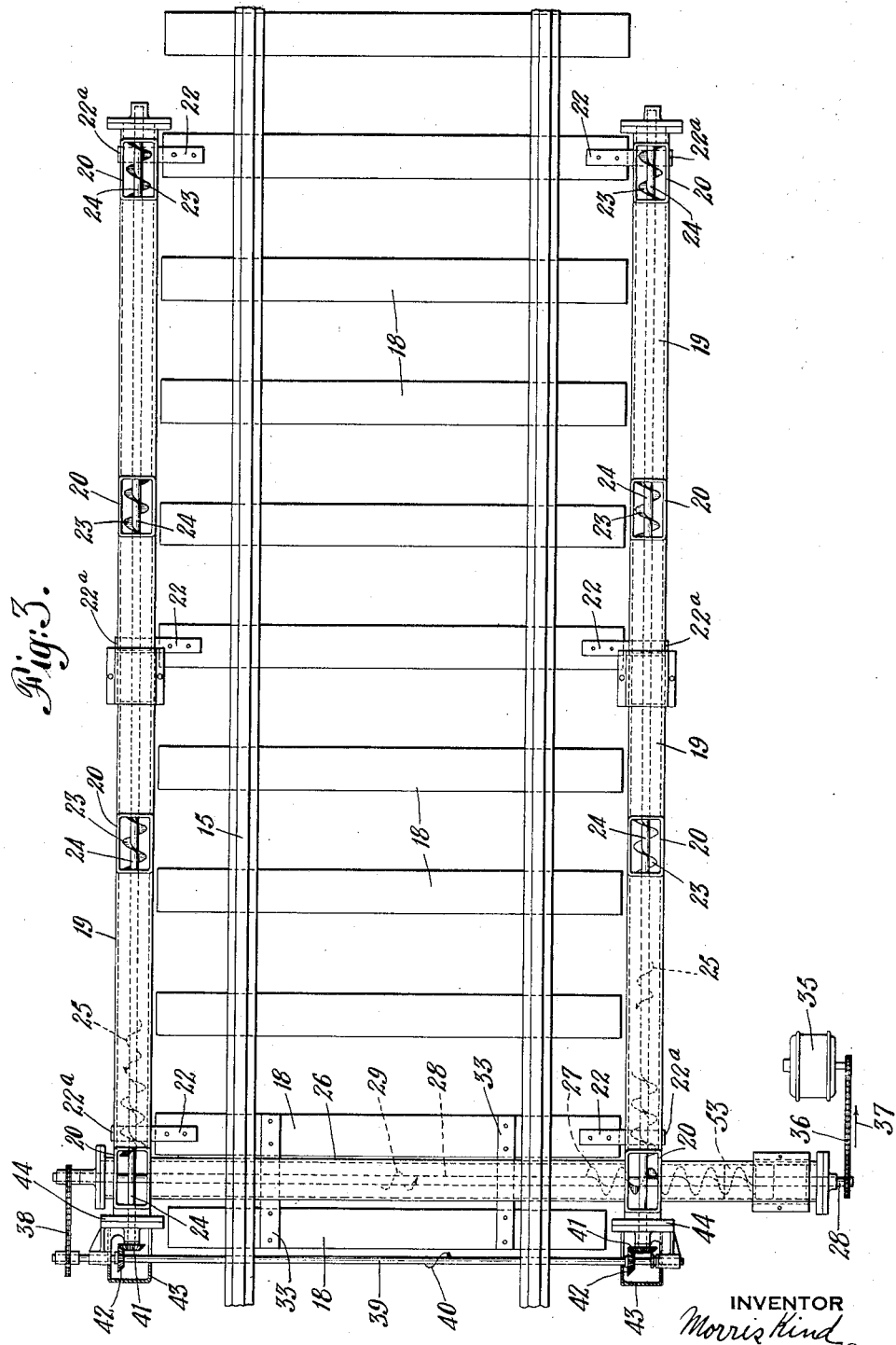

Sept. 8, 1931.                M. KIND                1,822,530
       APPARATUS FOR HANDLING CEMENT OR LIKE MATERIAL IN BULK
                    Filed June 14, 1930        4 Sheets-Sheet 4
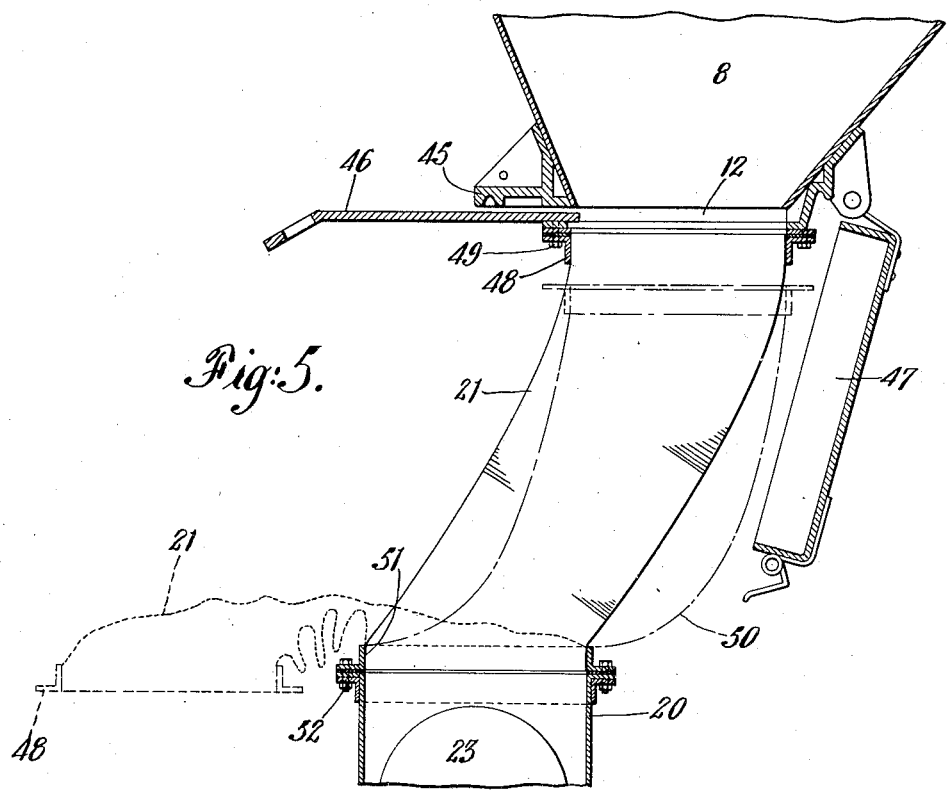
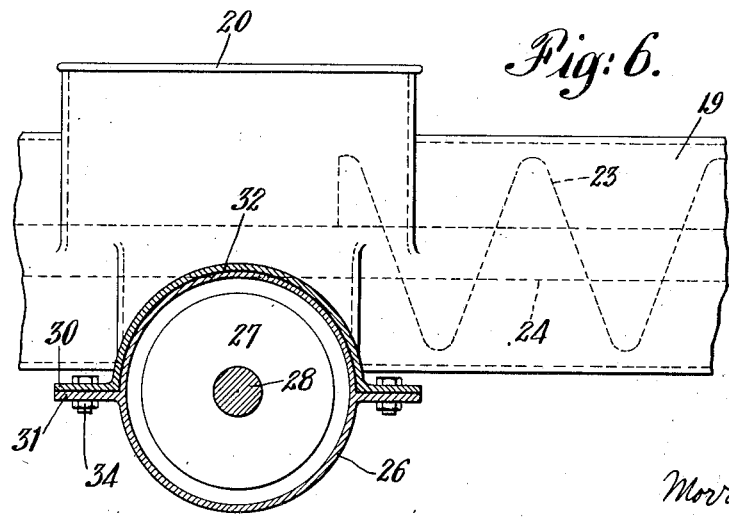
INVENTOR.
Morris Kind
BY
        ATTORNEYS.

Patented Sept. 8, 1931

1,822,530

UNITED STATES PATENT OFFICE

MORRIS KIND, OF BRYN MAWR, PENNSYLVANIA, ASSIGNOR TO HERCULES CEMENT CORPORATION, OF PHILADELPHIA, PENNSYLVANIA, A CORPORATION OF PENNSYLVANIA

APPARATUS FOR HANDLING CEMENT OR LIKE MATERIAL IN BULK

Application filed June 14, 1930. Serial No. 461,156.

This invention relates to apparatus for handling cement or similar materials in what is known as bulk condition and is particularly concerned with the provision of apparatus of this kind which can be utilized with railroad equipment.

As is well known, material such as cement, is handled almost entirely in bags because of certain difficulties experienced in keeping the bulk material sufficiently dry or because of the large amount of dust created in handling, measuring or transporting the bulk material.

By my improvements I am enabled to completely overcome the difficulties incident to the handling of cement or like material in bulk, as well as to greatly reduce the amount of time and money necessary in the handling of this commodity. In the accompanying specification and claims I will refer specifically to cement, but it is to be understood that my invention is applicable to the handling of other materials of similar character and that the term "cement" is not necessarily to be limited to cement alone.

The principal object of my invention is to provide improved equipment for transporting cement in bulk on the railroads without danger of wetting it and without the creation of excessive quantities of dust, either in loading the cars or in unloading them, particularly the latter.

The improvements herein disclosed are particularly useful in combination with a railroad freight car of the construction described in my copending application Serial No. 312,269, filed October 13, 1928.

More specifically stated the objects of my invention contemplate the provision of equipment for handling car load lots of cement in bulk which will occupy a minimum of space and will not require any special track construction at the point where unloading takes place; the provision of equipment of the character specified which can be installed at a reasonable cost and which will greatly reduce the time consumed in unloading a car of cement in bulk; the provision of equipment of the character specified which includes conveying mechanism especially adapted for application to existing types of track and road bed construction without in any way interfering with operation of cars upon the rails; the provision of equipment of this kind which includes readily detachable or demountable conveying mechanism which can be quickly set up or put into position for an unloading operation and just as quickly taken apart and packed up for shipment to a new location; the provision of conveying mechanism of the character hereinbefore set forth which will be absolutely water tight and substantially dust proof; the provision of suitable flexible and extensible conduits for connecting the hoppers to the unloading conveying mechanism which will accommodate themselves to the gradual rising of the car as the load decreases and which will prevent escape of dust or entrance of water and which can be used to suitably protect or cover the openings into the conveying apparatus after completion of an unloading operation; and the provision of an apparatus of this character by means of which a car load of cement in bulk can be uniformly unloaded from all portions of the car at the same time if desired.

The foregoing objects, together with such other objects as may appear hereinafter, or are incident to my invention, are obtained by means of a construction which is illustrated in the preferred form in the accompanying drawings, wherein—

Fig. 3 is a plan view of my improvements showing the unloading conveying mechanism with the car removed.

Figure 1:
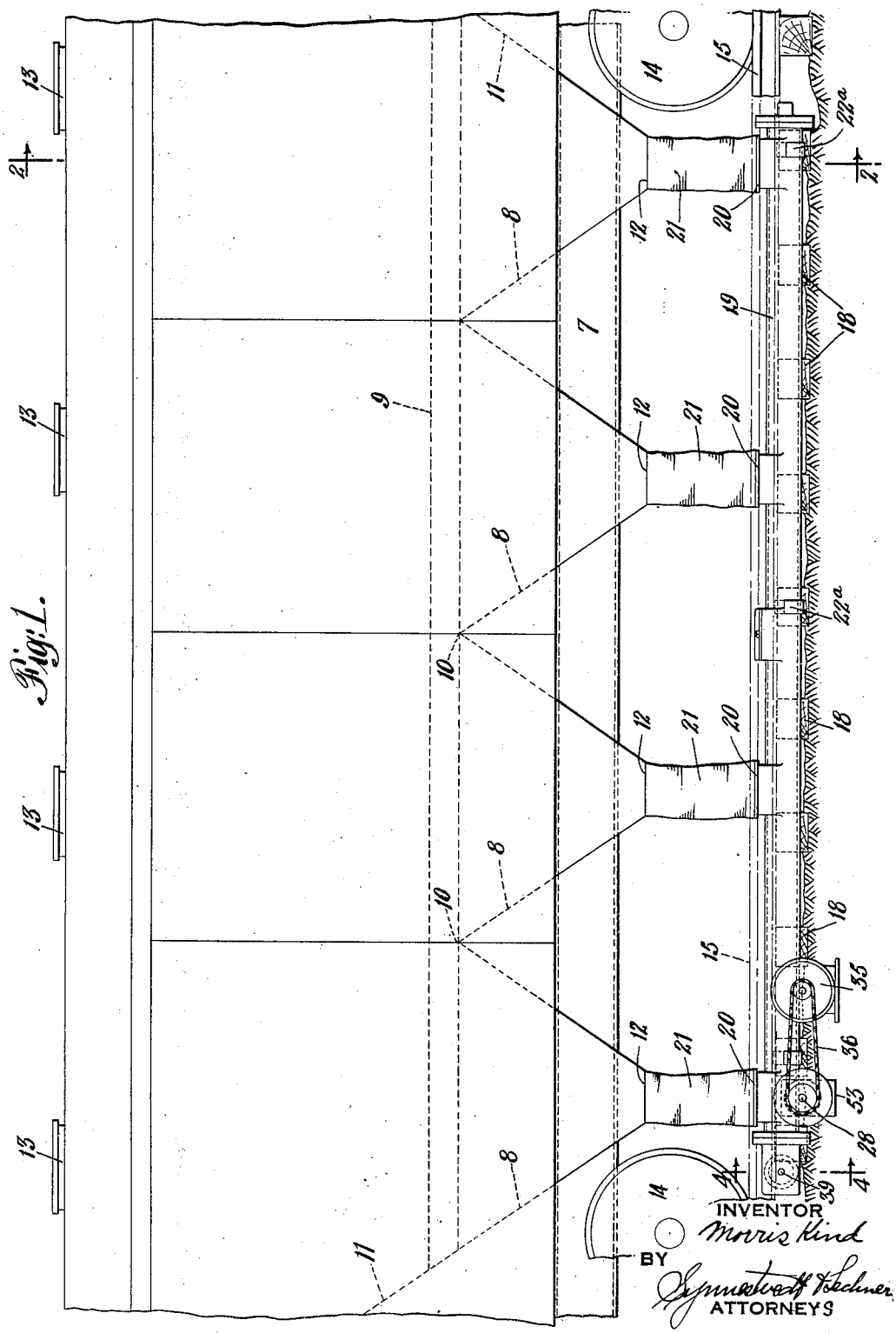
Fig. 1 is a partial side elevation of my improved apparatus including the freight car and the unloading mechanism.

Fig. 5 is a vertical sectional view on an enlarged scale through the lower portion of one of the hoppers of my improved car showing the manner in which it is connected to the unloading conveying mechanism and the manner in which the connecting conduit is used to protect the inlet to the coveying mechanism so as to prevent the entry of water or other extraneous matter, and Fig. 6 is a cross section taken through the transverse conveyor used with my preferred apparatus looking toward one of the longitudinal conveyors of such apparatus, with a portion of the longitudinal conveyor appearing in elevation.

My improved car, as will be seen more fully by reference to the copending application above referred to, comprises, in general, a suitable structural framework including the longitudinal beams 7 extending throughout the length of the car and resting at each end upon the truck bolsters 16, and a plurality of downwardly discharging hoppers 8, a series of which extend longitudinally of the car on each side of the draft beam 7. The bolsters 16, of course, are yieldingly supported in any desired or well known manner upon the axles of the trucks as by means of the springs 17.

The hoppers meet in a central ridge 9 and adjacent hoppers come together to form transverse ridges 10. The walls 11 of the end hoppers are inclined downwardly toward the outlet opening so that the entire contents of the car can gravitate toward the several outlet openings 12. The car is filled through suitably covered filling openings 13 in the roof.

Figure 2:
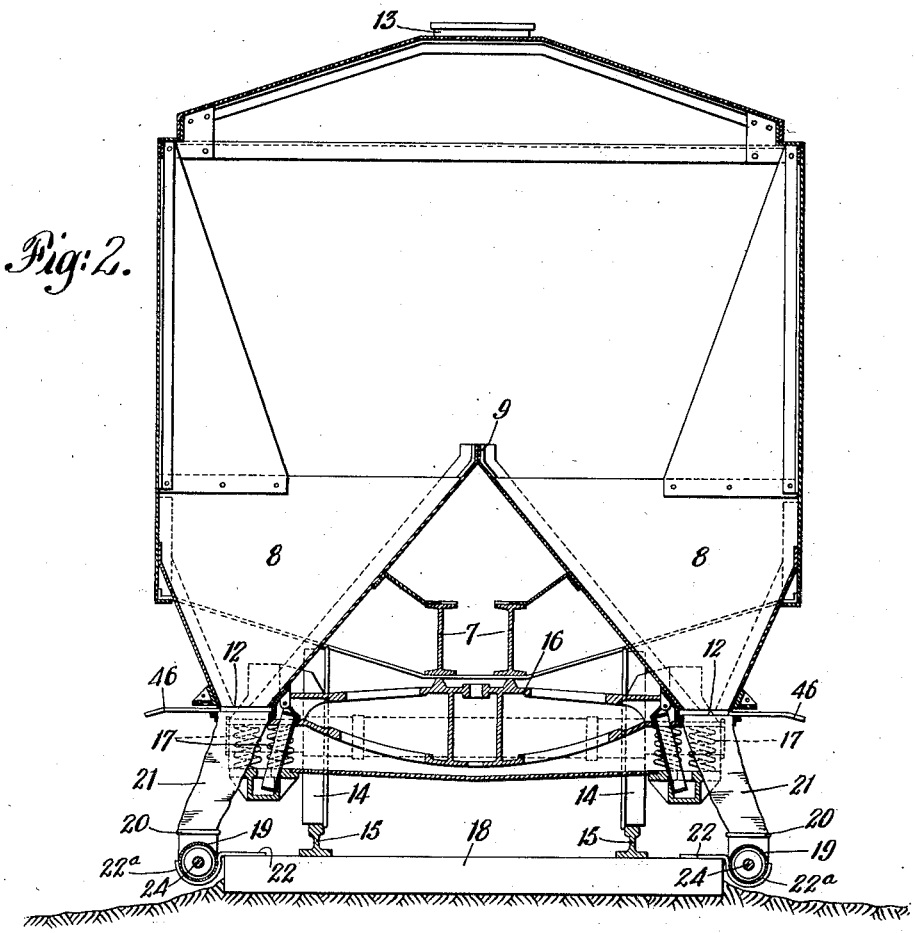
Fig. 2 is a section on the line 2—2 of Fig. 1.

As will be seen particularly from Fig. 2, the outlet openings 12 are preferably arranged to the outside of the wheels 14 and the rails 15.

To the outside of the rails and preferably along the ends of the ties 18 I arrange at each side of the track a longitudinal conveyor 19 having a series of suitable inlet openings 20 for receiving the discharge from the openings 12 of the hoppers 8.

The conveyors are preferably of the screw type as shown and the housings therefor are entirely water-proof and dust-proof. Connection is made between each outlet 12 and the corresponding inlet 20 by means of a water proof conduit or spout 21 which can be detachably secured around the outlet opening 12 as will appear more fully in connection with the description hereinbelow of Figure 5.

The water-proof conduits 21 are preferably made of suitably treated canvas, although this is by no means essential, and by making them slightly longer than necessary when the car is fully loaded with cement, these conduits will take care of the gradually increasing distance between the bottoms of the hoppers 8 and the tops of the conveyors as the load decreases during an unloading operation, the car, of course, gradually rising on the springs 17.

The longitudinal conveyors are supported at suitable intervals along their length by means of a plurality of straps 22 which have a flat extension adapted to be secured to the upper end of a tie 18 and a curved portion 22a which fits beneath the conveyor in the manner clearly shown in Fig. 2. All that it is necessary to do in mounting these longitudinal conveyors is to place the necessary straps 22, 22a and possibly push to one side just a small amount of whatever stone or other ballast may be encountered where the particular unloading operation is taking place. The screw 23 in each conveyor 19 is mounted upon a shaft 24 which is revolved, as will further appear, in the direction indicated by the dotted arrows 25 in Fig. 3.

The longitudinal conveyors 19 are arranged to discharge downwardly into a transverse conveyor 26 at one end. The transverse conveyor is also preferably of the screw type 27, the shaft 28 of which is rotated in the direction of the arrow 29 as seen in Fig. 3.

As will be seen to better advantage in Fig. 6, the longitudinal conveyors 19 are so disposed with respect to the transverse conveyor 26 as to bring the shaft 24 just above the screw 27 on the transverse conveyor. Furthermore, the longitudinal conveyor housings are formed with a downwardly opening flanged portion 30 adapted to fit against a correspondingly flanged portion 31 on the transverse conveyor and the joint between the two conveyors is maintained absolutely water-tight by means of a suitable gasket 32.

Figure 4:
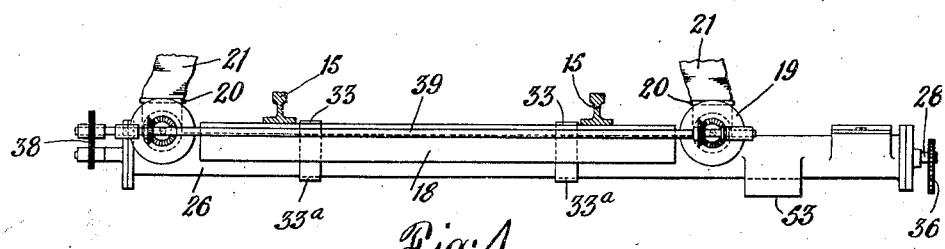
Fig. 4 is a section on the line 4—4 of Fig. 1.

As will be seen upon inspection of Figs. 3 and 4, the transverse conveyor 26 is located below the rails 15 and between a pair of adjacent ties 18. It is supported by straps 33 which are suitably curved at 33a to extend below the conveyor 26. When the transverse conveyor is in place and the longitudinal conveyors are properly arranged with their ends across the top of the ends of the transverse conveyor, they may all be securely fastened together by means of the bolts 34 (see Fig. 6).

All that it is necessary to do in placing the transverse conveyor is to dig out a small portion of the ballast between a pair of adjacent ties.

I prefer to provide one driving mechanism for all three conveyors and in the embodiment illustrated this takes the form of any suitable motor 35 which can be connected to the shaft 28 of the transverse conveyor by means of the chain 36, the chain being turned in the direction of the arrow 37.

At the opposite end the shaft 28 of the transverse conveyor is connected by means of another chain 38 to a transversely extending operating shaft 39 adapted to be placed adjacent the outside of the outer tie 18 upon which the transverse shaft is mounted and also under the rails. This appears most clearly in Fig. 3. The shaft 39, of course, will rotate in the direction of the arrow 40.

The ends of the longitudinal shafts 24 are fitted with bevel gears 41 which mesh with correspondng bevel gears 42 secured to the shaft 39. The gears are mounted in suitable housings 43 which can be bolted or otherwise secured to the conveyors by means of the flanges 44. The operating shaft 39, therefore, with its bevel gears 42, is readily detachable from the rest of the apparatus upon removing the chain 38 and loosening whatever type of fastening means is used in connection with the flanges 44.

The operation of the conveying mechanism, therefore, is as follows: The motor 35 drives the chain 36 which, in turn, revolves the shaft 28 of the transverse conveyor. The shaft 28, in turn, is connected to the shaft 39 by means of a second chain 38 and the shaft 39 drives each of the longitudinal conveying shafts 24 through the intermeshing bevel gears 41, 42. The whole conveying mechanism may be easily set up for an unloading operation and just as easily detached for transfer to another point and both operations in no way interfere with the use of the track, nor do they require any special track construction.

As seen in Fig. 5, the bottoms of the hoppers 8 are surrounded by a suitable framework 45 which carries a sliding gate 46, as well as a pivoted or swinging gate 47, the sliding gate being used to cut off the flow when necessary and the swinging gate 47 being designed to keep the contents of the hopper absolutely dry during transit.

The upper end of the canvas connecting spouts 21 is provided with a metallic ring or flange 48 which can be tightly bolted to the lower portion of the framework 45 by means of the bolts 49 after the pivoted door 47 has been swung to the position shown in Fig. 5. When the car is fully loaded the canvas will assume the general position indicated in dot and dash lines at 50, but when the car is empty the springs, of course, upon which it is mounted will raise it so that the canvas spout 21 will assume the full line position shown in Fig. 5.

The lower ends of the canvas conduits 21 are provided with flanged metallic rings 51, substantially like the rings 48 at their upper ends, and these rings 51 can be secured in any desired manner to the openings 20 in the longitudinal conveyors, as by the bolts 52.

When not in use the canvas conduits can be folded outwardly over the openings 20 as shown roughly by the dotted line position in Fig. 5. In this way the openings to the longitudinal conveyors will be protected against entrance of water or other foreign matter.

It will be seen that by my improvements it is possible to easily, conveniently and cheaply transport and handle cement or like material in bulk and that a car can be uniformly unloaded from all portions at the same time if desired. It will be understood, of course, that the transverse conveyor must be of a capacity and construction such as will take care of the discharge from both of the longitudinal conveyors. Its rate of rotation also will have to be designed so as to take care of the fact that it must handle all of the material coming from both of the longitudinal conveyors. Discharge from the transverse conveyor takes place preferably through the bottom opening 53 which can be connected either to a suitable storage receptacle or to a conduit for delivery to some means of local transportation, etc.

I claim :—

1. Mechanism for unloading cement or like material in bulk from a railroad freight car including in combination, a conveyor at each side of the car running longitudinally of the track along the ends of the ties, a transverse conveyor between a pair of ties below the track into which the longitudinal conveyors discharge, and a plurality of inlet openings in the upper side of the longitudinal conveyors distributed at intervals along the length thereof to receive the material from corresponding discharge openings on the car.

2. Mechanism for unloading cement or like material in bulk from a railroad freight car including in combination, a conveyor at each side of the car running longitudinally of the track along the ends of the ties, and a transverse conveyor between a pair of ties below the rails into which the longitudinal conveyors discharge.

3. Mechanism for unloading cement or like material in bulk from a railroad freight car including in combination, a conveyor at each side of the car running longitudinally of the track along the ends of the ties, and a transverse conveyor between a pair of ties below the rails into which the longitudinal conveyors discharge, all of said conveyors being interconnected and operated by a common driving means.

4. Apparatus for handling cement or like material in bulk including in combination, a car discharging downwardly at a plurality of longitudinally spaced points on each side, an enclosed longitudinal conveyor at each side having corresponding receiving openings, enclosed flexible conduit means connecting each car opening with its respective conveyor opening, and an enclosed transverse conveyor under the car receiving from said longitudinal conveyors.

5. Apparatus for unloading bulk cement or like material from railroad freight cars including in combination, conveying mechanism at each side of the car running longitudinally of the track along the ends of the ties, means for detachably securing said mechanisms to ties, transverse conveying mechanism below the rails between a pair of ties into which the longitudinal mechanisms discharge, and means for detachably securing said transverse mechanism to a tie.

6. Apparatus for unloading bulk cement or like material from railroad freight cars including in combination, conveying mechanism at each side of the car running longitudinally of the track along the ends of the ties, means for detachably securing said mechanisms to ties, transverse conveying mechanism below the rails between a pair of ties into which the longitudinal mechanisms discharge, and means for detachably securing said transverse mechanism to a tie, together with a common means for driving all of said mechanisms.

7. Mechanism for unloading cement or like material in bulk from a railroad freight car including in combination, a conveyor at each side of the car running longitudinally of the track along the ends of the ties means for detachably securing said conveyors to ties, a transverse conveyor between a pair of ties below the rails into which the longitudinal conveyors discharge, means for detachably securing said transverse conveyor to a tie, a detachable transverse driving connection between said longitudinal conveyors below the rails, a detachable driving connection between the transverse conveyor and said transverse driving connection, and means for driving a conveyor.

8. Mechanism for unloading cement or like material in bulk from a railroad freight car including in combination, a conveyor at each side of the car running longitudinally of the track along the ends of the ties, means for detachably securing said conveyors to ties, a transverse conveyor between a pair of ties below the rails into which the longitudinal conveyors discharge, means for detachbly securing said transverse conveyor to a tie, detachable driving means interconnecting said conveyors, and means for driving a conveyor.

9. Mechanism for unloading cement or like material in bulk from a railroad freight car including in combination, a conveyor at each side of the car running longitudinally of the track along the ends of the ties, means for detachably securing said conveyors to ties, a transverse conveyor between a pair of ties below the rails into which the longitudinal conveyors discharge, means for detachably securing said transverse conveyor to a tie, and detachable driving means for said conveyors.

10. Means for handling cement or like material in bulk including a spring supported railroad freight car having hopper means discharging downwardly to the outside of the rail, enclosed conveying mechanism for receiving said discharge, and an enclosed extensible conduit for connecting the hopper means with the conveying mechanism.

11. Apparatus for unloading cement or like material in bulk from a railroad freight car including in combination, a transverse conveyor beneath the rails removably mounted between a pair of ties, and a longitudinal conveyor at each side of the track for receiving the material from the car, said longitudinal conveyors being removably mounted along the ends of the ties and delivering into the transverse conveyor.

12. Apparatus for unloading cement or like material in bulk from a railroad freight car including in combination, a transverse conveyor beneath the rails removably mounted between a pair of ties, a longitudinal conveyor at each side of the track for receiving the material from the car, said longitudinal conveyors being removably mounted along the ends of the ties and delivering into the transverse conveyor, and removable means for actuating all of said conveyors.

13. Apparatus for unloading cement or like material in bulk from a railroad freight car including in combination, a transverse conveyor beneath the rails removably mounted between a pair of ties, a longitudinal conveyor at each side of the track for receiving the material from the car, said longitudinal conveyors being removably mounted along the ends of the ties and delivering into the transverse conveyor, all of said conveyors being adapted to be interconnected to operate in unison, and a readily detachable and removable means for driving a conveyor.

14. In apparatus for handling cement or like material in bulk, the combination of a spring supported railroad freight car having a plurality of longitudinally disposed, downwardly discharging hoppers, an enclosed longitudinal conveyor along the track having a corresponding series of openings for receiving said discharge, and a series of enclosed water proof conduits for connecting the hoppers with the openings, said conduits being extensible so as to accommodate themselves to the upward movement of the car as unloading continues and being flexible and detachable from the hoppers so as to be folded over the conveyor inlets when not in use.

15. Equipment for handling cement or like material in bulk comprising in combination, a railway car having a hopper at the side thereof discharging downwardly outside the rail, enclosed conveying means at the side of the track for receiving said discharge, and an enclosed extensible tube for connecting the hopper with said conveying means.

16. Equipment for handling cement or like material in bulk comprising in combination, a railway car discharging downwardly at a side thereof at a plurality of longitudinally spaced points outside of the rail, an enclosed longitudinal conveyor at the side of the track for receiving said discharge, and enclosed extensible tubes for connecting the points of discharge with said conveyor.

17. Equipment for handling cement or like material in bulk comprising in combination, a railway car having a discharge hopper at each side, enclosed conveying mechanism below the car for receiving said discharge, and extensible tubes for connecting the hoppers with said conveying mechanism.

18. Apparatus for handling cement or like material in bulk including a spring supported railroad freight car having a downwardly discharging hopper, enclosed conveying mechanism associated with the track and provided with an inlet opening for receiving said discharge and a flexible and extensible enclosed conduit means for connecting the hopper outlet with said inlet opening.

19. Apparatus for handling cement or like material in bulk including a spring supported railroad freight car having a longitudinally extending series of downwardly discharging hoppers, enclosed conveying mechanism extending longitudinally along the track provided with a corresponding series of inlet openings adapted to receive the discharge from said hoppers, an enclosed conveying mechanism extending beneath the rails transversely thereof having an inlet for receiving the discharge from said longitudinal conveyor, and flexible and extensible enclosed conduit means for connecting the hopper outlets with the inlet openings in said longitudinal conveying mechanism.

20. Apparatus according to claim 19 characterized by the fact that the conveying mechanisms are removably mounted on the ties.

21. Apparatus according to claim 19 characterized by the fact that the conveying mechanisms are interconnected to operate in unison and that means are provided for driving one of them.

22. Apparatus according to claim 19 characterized by the fact that the conveying mechanisms are removably mounted on the ties and interconnected to operate in unison and further by the fact that a readily removable means is also provided for driving one of said conveying mechanisms.

23. Mechanism for unloading cement or like material in bulk from a railroad freight car including in combination, a screw conveyor at each side of the car running longitudinally of the track, a transverse screw conveyor between a pair of ties below the rails into which the longitudinal conveyors discharge, a transverse driving shaft below the rails connected to all of said conveyors, and means for driving a conveyor.

24. Apparatus for handling cement or like material in bulk including a spring supported railroad freight car having a downwardly discharging hopper, a transverse screw conveyor below the rails between a pair of adjacent ties, and means for delivering the discharge from said hopper into said transverse conveyor, said means including a flexible and extensible enclosed conduit means adapted to be detachably secured to said hopper.

25. Apparatus for handling cement or like material in bulk including a spring supported railroad freight car having a downwardly discharging hopper, screw conveying mechanism associated with the track and provided with an inlet opening for receiving said discharge, and a flexible and extensible enclosed conduit means for connecting the hopper outlet with said inlet opening.

26. In combination, a car comprising a frame including a longitudinally extending draft beam, a body mounted on said frame including side and end walls, hoppers extending downwardly on opposite sides of the draft beam, said hoppers having openings adjacent the sides of the car body and flexible tubes arranged to be secured at their upper ends to the hoppers to receive discharges from the openings and at their lower ends to conveying means for the discharges, said flexible tubes permitting relative vertical movement of the car and receiving means during discharge.

27. In combination, a car comprising a frame including a longitudinally extending draft beam, a body mounted on said frame including side and end walls, hoppers extending downwardly on opposite sides of the draft beam, said hoppers having flanged openings adjacent the sides of the car body and flexible tubes having flanged upper ends arranged to be secured to the hopper flanges to receive discharges from the openings and arranged to be secured at their lower ends to conveying means for the discharges, said flexible tubes permitting relative vertical movement of the car and conveying means during discharge.

28. Mechanism for unloading cement or like material in bulk from a railroad freight car including in combination, conveying mechanism running longitudinally of the track along the ties, transverse conveying mechanism between a pair of ties below the track into which the longitudinal conveying mechanism discharges, and a plurality of inlet openings in the upper side of the longitudinal conveying mechanism distributed at intervals along the length thereof to receive the material from corresponding discharge openings on the car.

In testimony whereof I have hereunto signed my name.

MORRIS KIND.